Patented Oct. 25, 1949

2,486,182

UNITED STATES PATENT OFFICE 2,486,182

VINYL CHLORIDE-CONTAINING RESIN STABILIZED WITH PROPYLENE GLYCOL DIRICINOLEATE

Robert R. Lawrence, Springfield, Mass., assignor to Monsanto Chemical Company, St. Louis, Mo., a corporation of Delaware No Drawing. Application April 5, 1947,
Serial No. 739,656

7 Claims. (Cl. 260—23)

This invention relates to the art of stabilizing vinyl chloride-containing resins.

The stabilizing of vinyl chloride-containing resins has presented a serious problem, particularly with respect to discoloration on heating. Many types of stabilizing materials have been suggested for imparting heat stability to such resins but relatively few are especially effective.

It is an object of this invention to provide vinyl chloride-containing resins having improved resistance to deterioration.

A particular object of this invention is to provide vinyl chloride-containing resin compositions having increased heat resistance.

These and other objects are accomplished according to this invention by intimately mixing propylene glycol diricinoleate in a vinyl chloride-containing resin.

The following examples are illustrative of the invention, but are not to be considered as limitative thereof. Where parts are mentioned, they are parts by weight.

The compositions in the examples set forth in the table below are prepared by mixing 100 parts of polyvinyl chloride with 50 parts of di-2-ethyl hexyl phthalate and the indicated quantity of stabilizer (in those examples which include stabilizer). The ingredients are mixed on differential speed rolls at a roll temperature of 290° F. to form a homogeneous composition which is removed from the rolls in the form of crude sheets. From the crude sheets there are molded sheets which are about 0.020 inch in thickness using a molding cycle of 1 min. at 320° F.

For the purpose of determining the heat stability of the products of the examples, sheets approximately 3 inches long, 2 inches wide and 0.02 inch in thickness are suspended in a circulating air oven at 160° C. for the periods of time indicated in the table. The effect of the heat treatment is measured by determining light transmission values before and after the heat treatment, according to ASTM method D–672–44T using the Kline Bowen light transmission apparatus.

The light stability of the products of the examples is determined by exposure in an Atlas twin-arc weatherometer (3 min. water spray every 20 minutes).

In the example in the table the numerals in the stabilizer column represent parts by weight for every 100 parts by weight of polyvinyl chloride in the composition.

Table

| Example | Stabilizer | | Light Transmission | | | |
|---|---|---|---|---|---|---|
| | Type | Amount | No Exposure | Heated at 160° C., hours | | After 200 hours in weatherometer |
| | | | | 1 | 2 | |
| I | None | None | 88 | 64.5 | 50 | 34 |
| II | Propylene Glycol Diricinoleate | 2 | 87 | 82 | 55 | 56 |
| III | ----do---- | 5 | 89 | 85.5 | 72 | 53 |
| IV | ----do---- | 10 | 90 | 84.5 | 83 | 89 |
| V | ----do---- | 5 | | | | |
| | Linseed Oil | 1 | 90 | 81 | 74 | 88 |
| VI | Propylene Glycol Diricinoleate | 5 | | | | |
| | Linseed Oil | 2 | 90 | 82 | 74 | 85 |
| VII | Propylene Glycol Diricinoleate | 5 | | | | |
| | Linseed Oil | 5 | 90 | 81 | 74 | 86 |

As can be seen from the examples in the table, compositions having outstanding resistance to deterioration on heating are obtained in accordance with this invention. These results are particularly unexpected since it has previously been considered that complete esters of polyhydric alcohols made with unsaturated fatty acids have very little stabilizing effect. Possibly this belief was based on the use of other polyhydric alcohol esters since many of the complete esters of glycols and unsaturated fatty acids are of little or no use as stabilizers. For example, the substitution of other esters for the propylene glycol diricinoleate of Example III results in compositions which show even less light transmission after heating at 160° C. for 2 hours than does the product of Example I which contains no stabilizer. Thus, the use of ethylene glycol dioleate leads to products showing a light transmission value of 44.5 after 2 hours in contrast with 50 for the product of Example I and 72 for the product of Example III. Likewise, the value for diethylene glycol dioleate is 38, the value for ethylene glycol diricinoleate is 29 and the value of the propylene glycol ester of linseed oil acids is 50.

While the amount of the stabilizer of the invention which is incorporated in the vinyl chloride-containing polymer may be substantially varied and still result in a surprising improvement in stability, it is usually desirable to have at least 0.5 and preferably at least 2 parts of stabilizer for every 100 parts of polymer. The upper limit of the amount of stabilizer is usually determined by the compatibility of the stabilizer with the particular polymer. Thus, it is frequently not desirable to exceed 8 parts of stabilizer for every 100 parts of polymer, if exudation of stabilizer from the composition is to be avoided.

In place of the polyvinyl chloride, copolymers of vinyl chloride and other unsaturated materials copolymerizable therewith may be stabilized in accordance with the invention. For example, copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, orthochlorostyrene, para-chlorostyrene, 2,5-dichlorostyrene, 2,4-dichlorostyrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of α,β-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from vinyl chloride, represents a preferred class of polymers to be treated according to the invention.

A particularly preferred embodiment of the invention comprises the stabilization of polymers prepared by copolymerizing vinyl chloride and an ester of an α,β-unsaturated dicarboxylic acid such as diethyl maleate, in which 5–20 parts by weight of diethyl maleate are used for every 95–80 parts by weight of vinyl chloride. Among the preferred esters of α,β-unsaturated dicarboxylic acids are the alkyl esters in which the alkyl group contains 2–8 carbon atoms.

When desired, other stabilizers may be included along with the stabilizers of the invention. Thus, it may be desirable to include a material having a light stabilizing effect, as for example, such organo-metallic compounds as dibutyl tin diacetate, dibutyl tin dilaurate, etc. Thus, the inclusion of 0.25–1 part of such a stabilizer along with 5 parts of the stabilizer of the invention per 100 parts of polymer results in a production of exceptionally good light and heat stability.

Particularly unexpected is the discovery that the inclusion of glyceryl esters of fatty acids having ethylenic unsaturation enhances the light stability of the products containing propylene glycol diricinoleate. Such products are illustrated by the products set forth in Examples V, VI, VII. Among the advantages of compositions containing glyceryl esters of unsaturated fatty acids is the fact that products having a high degree of both heat and light stability are obtained in compositions containing amounts of propylene glycol diricinoleate well within its compatibility in the composition. Thus, a preferred group of compositions are those containing 2–8 parts of propylene glycol diricinoleate and 0.5–5 parts of a glyceryl ester of an unsaturated fatty acid containing 10–20 carbon atoms, for every 100 parts of vinyl chloride-containing polymer.

In place of linseed oil used in Examples V–VII, other materials containing glycerol esters of fatty acids containing 10–20 carbon atoms and characterized by ethylenic unsaturation may be used. Examples of such materials are China-wood oil, soya bean oil, cotton seed oil, blown linseed oil, castor oil, perilla oil, corn oil, sunflower oil, safflower oil, sesame oil, poppy seed oil, walnut oil, peanut oil, olive oil, rape seed oil, whale oil, and dehydrated castor oils.

Instead of using oils containing unsaturated esters of glycerin, single esters made from the unsaturated acids contained in these oils may be used. For example, esters of glycerin and the following unsaturated acids or mixtures thereof may be used: 7-hexadecenoic acid, 10-undecenoic acid, 13-docosenoic acid, 9-octadecenoic acid, 9,12-octadecadienoic acid, 9,12,15-octadecatrienoic acid, 9,11,13-octadecatrienoic acid, 16-hydroxy-7-hexadecenoic acid, 12-hydroxy-9-octadecenoic acid, etc.

It is obvious that many variations may be made in the processes and products of this invention without departing from the spirit and scope thereof as defined in the appended claims.

What is claimed is:

1. A composition comprising a vinyl chloride-containing polymer, and as a heat stabilizer therefor, a compatible amount of propylene glycol diricinoleate which is at least 0.5 part for every 100 parts of polymer.

2. A composition as defined in claim 1 in which the polymer is polyvinyl chloride.

3. A composition as defined in claim 1 in which the polymer is a copolymer of vinyl chloride and vinyl acetate.

4. A composition as defined in claim 1 in which the polymer is a copolymer of vinyl chloride and diethyl maleate.

5. A composition as defined in claim 1 which also includes 0.5–5 parts of a glycerol ester of an unsaturated fatty acid containing 10–20 carbon atoms for every 100 parts of polymer.

6. A composition as defined in claim 1 which also contains 0.5–5 parts of linseed oil for every 100 parts of polymer.

7. A composition comprising polyvinyl chloride and, as a heat and light stabilizer therefor, a combination of 2–8 parts of propylene glycol diricinoleate and 0.5–5 parts of linseed oil for every 100 parts of polyvinyl chloride.

ROBERT R. LAWRENCE.

REFERENCES CITED

The following references are of record in the file of this patent:

UNITED STATES PATENTS

| Number | Name | Date |
|---|---|---|
| 2,274,555 | Japs | Feb. 24, 1942 |